(12) United States Patent
Miyamoto et al.

(10) Patent No.: US 8,909,402 B2
(45) Date of Patent: Dec. 9, 2014

(54) VEHICLE CONTROL SYSTEM AND VEHICLE CONTROL METHOD

(71) Applicants: Tomohiko Miyamoto, Toyota (JP); Kenjiro Nagata, Okazaki (JP)

(72) Inventors: Tomohiko Miyamoto, Toyota (JP); Kenjiro Nagata, Okazaki (JP)

(73) Assignees: Toyota Jidosha Kabushiki Kaisha, Toyota-shi (JP); Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 13/726,712

(22) Filed: Dec. 26, 2012

(65) Prior Publication Data

US 2013/0173104 A1    Jul. 4, 2013

(30) Foreign Application Priority Data

Dec. 28, 2011  (JP) ................. 2011-289159

(51) Int. Cl.
| | |
|---|---|
| *B60L 11/00* | (2006.01) |
| *B60W 20/00* | (2006.01) |
| *F16H 61/00* | (2006.01) |
| *H02K 9/193* | (2006.01) |
| *B60K 1/00* | (2006.01) |

(52) U.S. Cl.
CPC .......... *H02K 9/193* (2013.01); *B60K 2001/006* (2013.01); *B60W 20/00* (2013.01); *F16H 61/0031* (2013.01); *B60W 2510/081* (2013.01); *B60W 2510/087* (2013.01); *Y10S 903/902* (2013.01)

USPC ................ 701/22; 180/65.27; 903/902

(58) Field of Classification Search
USPC ............ 701/22, 36; 307/9.1; 180/65.27; 903/902–903
See application file for complete search history.

(56) References Cited

U.S. PATENT DOCUMENTS

2004/0093149 A1* 5/2004 Hara ....................... 701/104

FOREIGN PATENT DOCUMENTS

| JP | 2004-256063 A | 9/2004 |
| JP | 2007-112290 A | 5/2007 |

* cited by examiner

*Primary Examiner* — Yonel Beaulieu
(74) *Attorney, Agent, or Firm* — Gifford, Krass, Sprinkle, Anderson & Citkowski, P.C.

(57) ABSTRACT

A vehicle control system is configured to include a motive power unit that includes an engine and a rotating electrical machine, a power supply device that is connected to the rotating electrical machine, a pump unit that includes an electric oil pump and a mechanical oil pump for cooling the rotating electrical machine, and a control device. The control device is configured to include a carrier frequency determination unit, a rotating electrical machine determination unit, a vehicle required traveling state determination unit, a motive power unit operation mode determination unit that makes a determination on the operation mode of the motive power unit, and an EOP operation control unit that controls the operation of the electric oil pump on the basis of these determinations.

12 Claims, 6 Drawing Sheets

VEHICLE CONTROL SYSTEM AND VEHICLE CONTROL METHOD

INCORPORATION BY REFERENCE

The disclosure of Japanese Patent Application No. 2011-289159 filed on Dec. 28, 2011 including the specification, drawings and abstract is incorporated herein by reference in its entirety.

BACKGROUND OF THE INVENTION

1. Field of the Invention

The invention relates to a vehicle control system and a vehicle control method. In particular, the invention relates to a vehicle control system and a vehicle control method for a vehicle that employs an electric oil pump to cool a rotating electrical machine.

2. Description of Related Art

In a vehicle that is mounted with a rotating electrical machine, an oil pump for circulating a coolant that cools the rotating electrical machine is employed. In a vehicle that is mounted with an engine as well as a rotating electrical machine, a mechanism oil pump that is connected to an output rotary shaft of the engine can be employed. When the engine stops, this mechanical oil pump also stops operating. Thus, an electric oil pump that is driven regardless of the operation of the engine is employed, so that the rotating electrical machine can be cooled while the engine is stopped.

For example, it is described in Japanese Patent Application Publication No. 2004-256063 (JP-2004-256063 A) that, in a control apparatus for a vehicle, when the discharge rate of a mechanical oil pump that is driven by an engine during the cut-off of fuel supply becomes insufficient, an oil pump driven by a motor-generator or an electric oil pump is driven.

Incidentally, as an art related to the invention, it is described in Japanese Patent Application Publication No. 2007-112290 (JP-2007-112290 A) that the optimal rotational speed is set in such a manner as to increase as the carrier frequency used for a drive circuit of an electric motor increases when a vehicle is equipped with an internal combustion engine and the electric motor as motive power output units.

As described in Japanese Patent Application Publication No. 2007-112290 (JP-2007-112290 A), the carrier frequency in the drive circuit of a rotating electrical machine may be changed in accordance with the traveling state of the vehicle. For example, when the rotational speed of the rotating electrical machine is high while the vehicle travels at high speed, the carrier frequency is set high in order to maintain the controllability thereof. Besides, on the contrary, when the rotational speed of the rotating electrical machine is low while the vehicle travels at low speed, the carrier frequency is set low. When the carrier frequency becomes low, the amplitude of ripple noise on a drive signal of the rotating electrical machine becomes large. Then, the loss in the rotating electrical machine increases, and the temperature of the rotating electrical machine rises.

In order to cool the rotating electrical machine, it is possible to employ a mechanical oil pump or an electric oil pump. However, since the mechanical oil pump is driven by an engine, the discharge rate of a coolant is determined in accordance with the rotational speed of the engine. In this manner, the cooling capacity of the mechanical oil pump changes depending on the operation state of the engine. Accordingly, if the mechanical oil pump is employed to cool the rotating electrical machine when the temperature of the rotating electrical machine has risen due to a change in the carrier frequency, the rotating electrical machine is insufficiently cooled in some cases.

SUMMARY OF THE INVENTION

The invention provides a vehicle control system and a vehicle control method that make it possible to appropriately cool a rotating electrical machine even when the carrier frequency is changed.

A vehicle control system of a first aspect of the invention is equipped with a motive power unit that has a rotating electrical machine, a drive circuit that is connected to the rotating electrical machine and operates on the basis of a certain carrier frequency, a pump unit that circulates a coolant that cools the rotating electrical machine, and a control device that increases a cooling capacity of the pump unit for cooling the rotating electrical machine when the carrier frequency is equal to or lower than a preset threshold frequency.

Thus, the rotating electrical machine whose temperature rises when the carrier frequency is changed to a low value can be appropriately cooled.

In a vehicle control method of a second aspect of the invention, a cooling capacity of a pump unit that circulates a coolant that cools a rotating electrical machine is increased, when a carrier frequency preset for a drive circuit that is connected to the rotating electrical machine is equal to or lower than a threshold frequency.

Thus, the rotating electrical machine whose temperature rises when the carrier frequency is changed to a low value can be appropriately cooled.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein.

DETAILED DESCRIPTION OF EMBODIMENT

The embodiment according to the invention will be described hereinafter in detail using the drawings. Hereinafter, a configuration having, as a motive power unit, a motive power transmission mechanism that is provided between an engine and a single rotating electrical machine will be described. However, this is an exemplification for illustration. In this case, any configuration having an engine and a rotating electrical machine is acceptable. In addition, the relationship between the output of the engine and the output of the rotating electrical machine can be appropriately changed in accordance with the specification of a vehicle. Besides, the description will be given on the assumption that a single rotating electrical machine is mounted on the vehicle. However, this is also an exemplification, and there may also be a case where a plurality of rotating electrical machines are mounted on the vehicle. For example, it is appropriate to adopt a configuration in which one rotating electrical machine is employed for driving and the other rotating electrical machine is employed for electric power generation. In addition, separate rotating electrical machines may be employed to drive front wheels and rear wheels respectively.

Besides, a power supply device that is connected to the rotating electrical machine will be described as including an electric storage device, a voltage converter, a smoothing capacitor, and an inverter. However, this is the description of main component elements of the power supply device. Therefore, the power supply device may include other component elements. For example, the power supply device may include a low-voltage inverter circuit, a system main relay, a DC/DC converter, and the like. Besides, a power supply for a drive circuit of an electric oil pump will be described as a low-voltage power supply independent of the power supply device of the rotating electrical machine. However, this is an exemplification for illustration. For example, an electric power obtained through voltage conversion into a low voltage may be supplied from the power supply device of the rotating electrical machine to the drive circuit of the electric oil pump.

Besides, in the following description, the rotating electrical machine and the motive power transmission mechanism are accommodated in a single case body. In addition, the description will be given on the assumption that a coolant circulates between the interior of the case body and a pump unit. However, this is an exemplification for illustration. For example, it is appropriate to adopt a configuration in which the coolant circulates among the rotating electrical machine, the motive power transmission mechanism, and the pump unit, instead of packing the rotating electrical machine and the motive power transmission mechanism into a single case.

Hereinafter, similar elements will be denoted by the same reference symbols respectively in all the drawings, and the same description will be omitted. Besides, in the description in the text, previously mentioned reference symbols are used according to need.

Figure 1:
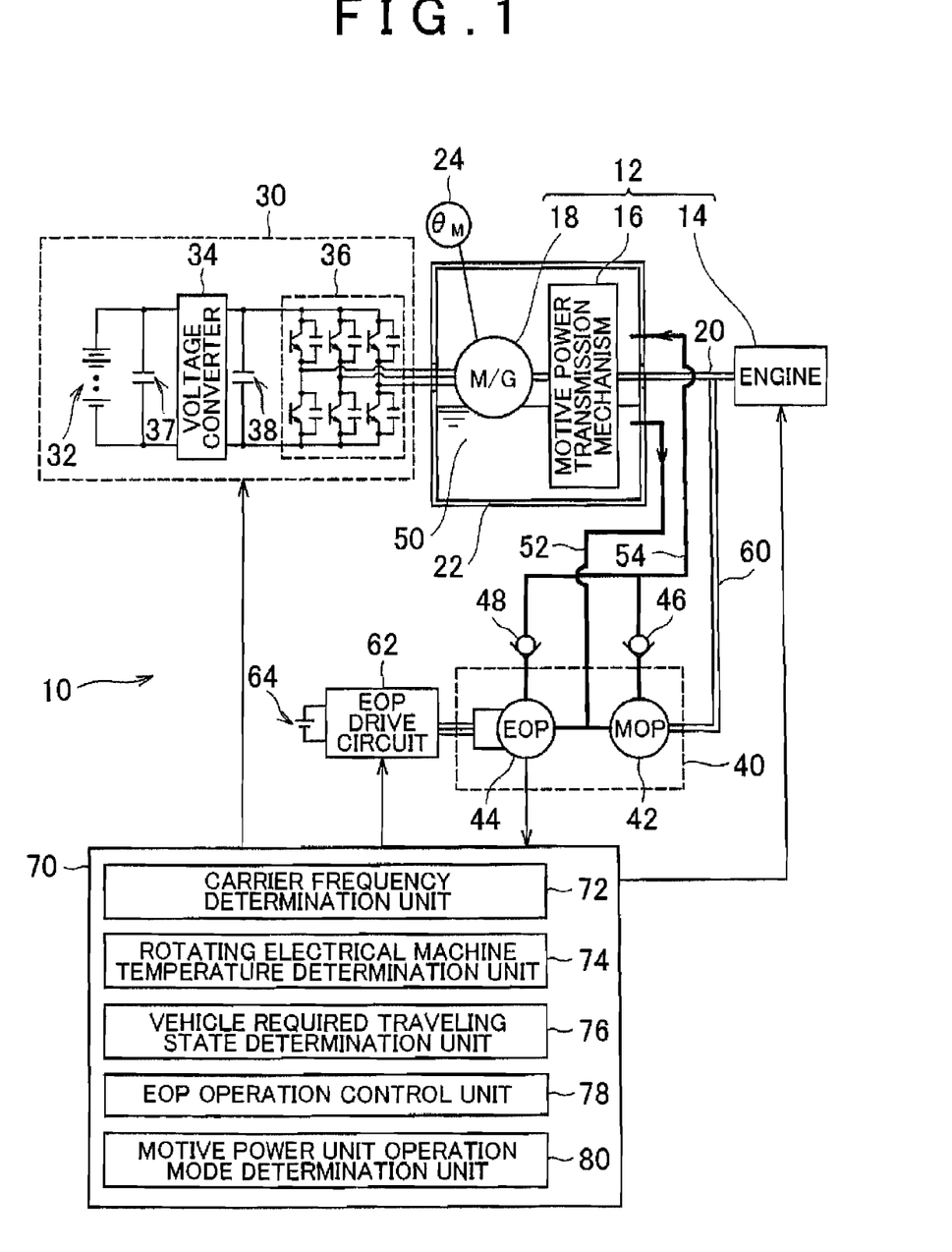
FIG. 1 is a configuration diagram of a vehicle control system of the embodiment according to the invention.

FIG. 1 is a diagram showing the configuration of a vehicle control system 10 for a hybrid vehicle. This vehicle control system 10 is a system that appropriately controls the operation of an engine 14 and a rotating electrical machine 18, which constitute a motive power unit 12, and the driving of a pump unit 40 for cooling the rotating electrical machine 18.

The vehicle control system 10 includes the engine 14 and the rotating electrical machine 18 as the motive power unit 12, which serves as a drive source of the hybrid vehicle. Besides, the vehicle control system 10 includes, as a power supply device 30 that is connected to the rotating electrical machine 18 an electric storage device 32, a voltage converter 34, an inverter 36, and smoothing capacitors 37 and 38. The vehicle control system 10 further includes the pump unit 40, which supplies a coolant 50 into a case body 22, which includes the rotating electrical machine 18 therein, through circulation.

The pump unit 40 is configured to include a mechanical oil pump 42 and an electric oil pump 44. The mechanical oil pump 42 is driven by the engine 14. The electric oil pump 44 is driven by an EOP drive circuit 62 that operates by a low-voltage power supply 64. In addition, the vehicle control system 10 is configured to include a control device 70 that controls these operations as a whole.

The motive power unit 12 is configured to include the engine 14, the rotating electrical machine 18, and a motive power transmission mechanism 16 that is provided between the engine 14 and the rotating electrical machine 18. The engine 14 is an internal combustion engine. Besides, the rotating electrical machine 18 is a motor-generator (an M/G) that is mounted on the hybrid vehicle. In addition, the rotating electrical machine 18 is a three-phase synchronous rotating electrical machine that functions as a motor when the hybrid vehicle is supplied with an electric power from a power supply device 30 that includes an inverter 36 as a drive circuit, and that functions as a generator when the hybrid vehicle is driven by the engine 14 or braked.

A temperature detector 24 that is provided on the rotating electrical machine 18 is a rotating electrical machine temperature detector that detects a temperature of the rotating electrical machine 18. Data detected by the temperature detector 24 are transmitted to the control device 70, using an appropriate signal line.

The motive power transmission mechanism 16 is a mechanism that has a function of distributing a motive power to be supplied to the hybrid vehicle between an output of the engine 14 and an output of the rotating electrical machine 18. As this motive power transmission mechanism 16, it is possible to employ a planetary gear mechanism that is connected to three shafts, namely, an output shaft of the engine 14, an output shaft of the rotating electrical machine 18, and an output shaft leading to an axle (not shown). A shaft that connects the motive power transmission mechanism 16 and the engine 14 to each other in FIG. 1 is an output shaft 20 of the engine 14. This output shaft 20 is connected to a drive shaft of the mechanical oil pump 42 via a connecting shaft 60, and is used to drive the mechanical oil pump 42.

The power supply device 30 is a device for driving the rotating electrical machine 18. The electric storage device 32 that constitutes the power supply device 30 is a rechargeable high-voltage secondary battery. More specifically, the electric storage device 32 is a lithium-ion assembled battery that has a terminal voltage ranging from about 200V to about 300 V. The assembled battery is designed to obtain the aforementioned predetermined terminal voltage through the combination of a plurality of batteries called electric cells or battery cells, whose terminal voltage ranges from 1 V to several volts. As the electric storage device 32, it is possible to employ a nickel hydride assembled battery, a large-capacity capacitor, or the like.

The voltage converter 34 is arranged between the electric storage device 32 and the inverter 36. In addition, the voltage converter 34 is a circuit having a direct-current voltage conversion function. The voltage converter 34 is configured to include a reactor and a switching element. The voltage converter 34 has, as the voltage conversion function, a step-up function of stepping up a voltage on the electric storage device 32 side with the aid of the energy accumulation behavior of the reactor to supply the stepped-up voltage to the inverter 36 side, and a step-down function of stepping down an electric power from the inverter 36 side to supply the stepped-down voltage to the electric storage device 32 side as an electric power for charging.

The inverter 36 is a drive circuit that is connected to the rotating electrical machine 18, and is configured to include a plurality of switching elements, a plurality of reverse connection diodes, and the like. In addition, the inverter 36 changes direct current power to an alternating-current electric power and vice versa. That is, the inverter 36 has an alternating-direct conversion function of converting an alternating-current three-phase regenerative electric power from the rotating electrical machine 18 into a direct-current electric power to supply the direct-current electric power to the electric storage device 32 side as an electric power for charging, when the rotating electrical machine 18 is caused to function as a generator. Besides, the inverter 36 has a direct-alternating conversion function of converting a direct-current electric power from the electric storage device 32 side into an alternating-current three-phase driving electric power to supply the alternating-current three-phase driving electric power to the rotating electrical machine 18 as an alternating-current driving electric power.

The inverter 36 is a circuit that generates a three-phase drive signal through pulse width modulation (PWM) control for appropriately adjusting the timings at which the plurality of the switching elements are turned on and off, and supplies the three-phase driving signal to the rotating electrical machine 18. PWM control is control of modulating the pulse width through a comparison between a fundamental wave signal having a cycle corresponding to a rotation period of the rotating electrical machine 18 and a carrier signal having a sawtooth waveform. The frequency of the carrier signal is called a carrier frequency. In this manner, the carrier frequency is set in accordance with the frequency of fundamental waves in order to ensure the controllability of PWM control. For example, when the rotational speed of the rotating electrical machine 18 becomes high, the frequency of fundamental waves becomes high, so that a high carrier frequency is set. On the contrary, when the rotational speed of the rotating electrical machine 18 becomes low, the frequency of fundamental waves becomes low, so that a low carrier frequency is set.

A smoothing capacitor 37 that is provided between the electric storage device 32 and the voltage converter 34 is a capacitor element that has a function of smoothing the voltage and electric current on the electric storage device 32 side. Besides, a smoothing capacitor 38 that is provided between the voltage converter 34 and the inverter 36 is a capacitor element that has a function of smoothing the voltage and electric current on the inverter 36 side.

The case body 22 is a housing that includes the motive power transmission mechanism 16 and the rotating electrical machine 18 therein. The case body 22 is stores the coolant 50 in its interior space. The coolant 50 lubricates the motive power transmission mechanism 16 and a movable region of the rotating electrical machine 18, and cools the power transmission mechanism 16 and the rotating electrical machine 18. As the coolant, it is possible to employ a lubricating oil called automatic transmission fluid (ATF).

The pump unit 40 is a unit that includes the mechanical oil pump 42 and the electric oil pump 44. In addition, the pump unit 40 has a function of supplying the coolant 50 to the inner space of the case body 22 through circulation. A coolant discharge channel 52 is a coolant flow pipe that couples a coolant discharge port, which is provided on a lower side of the case body 22 along the gravitational direction or at a location close to a bottom of the case body 22, and the pump unit 40 to each other. A coolant supply channel 54 is a coolant flow pipe that couples the pump unit 40 and a coolant supply port, which is provided on an upper side of the case body 22 along the gravitational direction or at a location close to a ceiling portion of the case body 22, to each other.

The mechanical oil pump 42 and the electric oil pump 44 are connected in parallel with each other between the coolant discharge channel 52 and the coolant supply channel 54. A check valve 46 is a valve that is provided to prevent the coolant 50 from flowing backward between the mechanical oil pump 42 and the coolant supply port of the case body 22. By the same token, a check valve 48 is a valve that is provided to prevent the coolant 50 from flowing backward between the electric oil pump 44 and the coolant supply port of the case body 22.

The mechanical oil pump 42, which is shown as MOP in FIG. 1, is a pump whose drive shaft is connected to the output shaft 20 of the engine 14 via the connecting shaft 60. The mechanical oil pump 42 is driven when the engine 14 operates. That is, the driving of the mechanical oil pump 42 is started as the engine 14 is started, and the driving of the mechanical oil pump 42 is ended as the engine 14 is stopped.

The electric oil pump 44, which is shown as EOP in FIG. 1, is driven by an EOP drive circuit 62 under a control signal from the control device 70. The EOP drive circuit 62 is supplied with a direct-current electric power from a low-voltage power supply 64. The low voltage means a voltage lower than the voltage of the electric storage device 32, and it is possible to use a voltage of, for example, about 12 to 16 V. As a motor that rotates the drive shaft of the electric oil pump 44, it is possible to employ a three-phase synchronous motor. In this case, the EOP drive circuit 62 is configured to include an inverter that has a direct current/alternating current conversion function. Incidentally, a single-phase alternating-current motor or a direct-current motor can also be employed instead of the three-phase synchronous motor. The contents of the EOP drive circuit 62 are changed in accordance with the motor type of a motor that is employed to rotate the drive shaft of the electric oil pump 44.

The control device 70 is a control circuit that has a function of controlling the aforementioned respective elements as a whole. However, in this case in particular, the control device 70 has a function of performing the control of appropriately cooling the rotating electrical machine 18 and the like while selectively using the mechanical oil pump 42 and the electric oil pump 44 in accordance with the carrier frequency. This control device 70 can be configured as a computer that is suited to be mounted on a vehicle.

The control device 70 includes a carrier frequency determination unit 72, a rotating electrical machine temperature determination unit 74, and a vehicle required traveling state determination unit 76. The carrier frequency determination unit 72 determines whether or not a carrier frequency f is equal to or lower than a threshold frequency $f_0$. The rotating electrical machine temperature determination unit 74 determines whether or not a temperature $\theta_M$ of the rotating electrical machine 18 is equal to or higher than a predetermined first threshold temperature $\theta_{M0}$. The vehicle required traveling state determination unit 76 determines whether or not a traveling state required of the hybrid vehicle reaches a predetermined critical traveling state. The critical traveling state is a critical vehicle traveling state of the vehicle in which the cooling of the rotating electrical machine 18 can be covered by the electric oil pump 44 alone.

Besides, the control device 70 is configured to include an EOP operation control unit 78 that controls the operation of the electric oil pump 44, and a motive power unit operation mode determination unit 80 that determines whether the operation mode of the motive power unit 12 is an EV operation mode or an I-IV operation mode. It should be noted herein that the EV operation mode is an operation mode in which the rotating electrical machine 18 is operated without operating the engine 14, and that the HV operation mode is an operation mode in which both the engine 14 and the rotating electrical machine 18 can be operated.

These functions of the control device 70 can be realized by running software. More specifically, these functions of the control device 70 can be realized by executing an oil pump operation control program.

Figure 2:
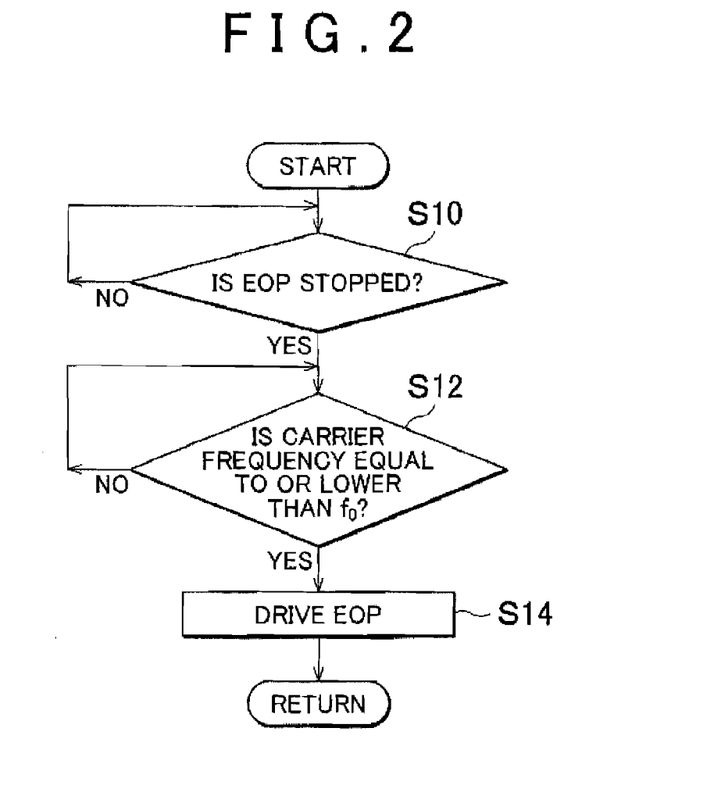
FIG. 2 is a flowchart showing a procedure of driving an electric oil pump in accordance with a carrier frequency in the embodiment according to the invention.

FIG. 2 is a flowchart showing the most basic procedures of selectively using the mechanical oil pump 42 and the electric oil pump 44 when the carrier frequency f is changed. The respective procedures correspond to the respective processing procedure of the oil pump operation control program.

In this case, first of all, it is determined whether or not the electric oil pump 44 has been stopped (S10). In the case where means for detecting a rotational speed of the electric oil pump 44 is provided, this determination can be made on the basis of whether or not the rotational speed of the electric oil pump 44 is equal to zero. Alternatively, this determination can also be made on the basis of whether or not a drive command signal has been output from the control device 70 to the EOP drive circuit.

If a positive determination is made in S10, it is then determined whether or not the carrier frequency f is equal to or lower than a predetermined threshold frequency $f_0$ (S12). This procedure is executed through the function of the carrier frequency determination unit 72 of the control device 70. More specifically, in the control device 70, the value of the carrier frequency f set for the inverter 36 is compared with the threshold frequency $f_0$. The threshold frequency $f_0$ is set in accordance with a rise in a temperature $\theta_M$ of the rotating electrical machine 18 that results from a decrease in the carrier frequency f.

The carrier frequency f in the inverter 36 is set in advance according to the frequency of the fundamental wave signal used for control, in order to ensure the controllability of the rotating electrical machine 18. When the frequency of the fundamental wave signal is high, the carrier frequency f is set high. When the frequency of the fundamental wave signal is low, the carrier frequency f is set low. The frequency of the fundamental wave signal is a frequency corresponding to the rotational speed of the rotating electrical machine 18. In the fundamental wave signal, noise resulting from this carrier frequency emerges as a ripple.

Figure 3A:
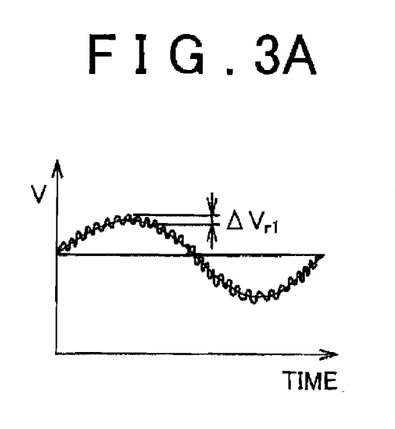
FIG. 3A is a diagram illustrating a relationship between ripple noise and carrier frequency in a fundamental wave signal of drive control of a rotating electrical machine.
Figure 3B:
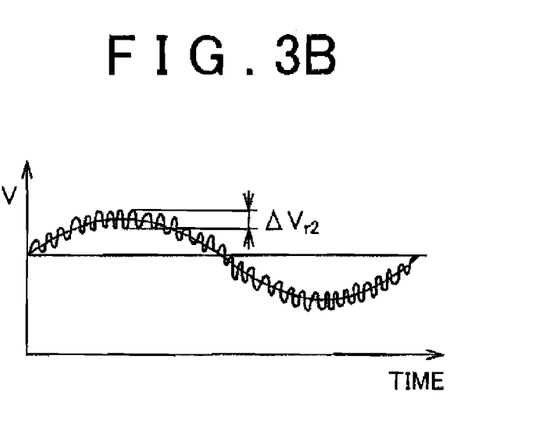
FIG. 3B is a diagram illustrating a relationship between ripple noise and carrier frequency in a fundamental wave signal of drive control of the rotating electrical machine.

FIGS. 3A and 3B are diagrams showing the cycle of a fundamental wave signal and the magnitude of ripple noise. FIG. 3A shows the cycle of the fundamental wave signal and the magnitude of ripple noise in a case wherein the rotational speed of the rotating electrical machine 18 is high and the vehicle speed of the hybrid vehicle is high in the case where the cycle of the fundamental wave signal is short. FIG. 3B shows the cycle of the fundamental wave signal and the magnitude of ripple noise in a case wherein the rotational speed of the rotating electrical machine 18 is low and the vehicle speed of the hybrid vehicle is low in the case where the cycle of the fundamental wave signal is long. In these drawings, the axis of abscissa represents time, and the axis of ordinate represents voltage indicating signal amplitude. In each of the drawings, a fundamental wave signal waveform corresponding to about one cycle is shown, and cyclic ripple noise superimposed on this fundamental wave signal waveform is observable.

A comparison between an amplitude $\Delta V_{r1}$ of ripple noise of FIG. 3A and an amplitude $\Delta V_{r2}$ of ripple noise of FIG. 3B reveals that the amplitude of ripple noise is larger in FIG. 3B in which the cycle of the fundamental wave signal is long and the carrier frequency f is low. When the amplitude of ripple noise is large, the loss in the rotating electrical machine 18 becomes large, the temperature $\theta_M$ of the rotating electrical machine 18 rises, and the necessity for cooling arises. In this manner, the temperature $\theta_M$ of the rotating electrical machine 18 rises as the carrier frequency f decreases. Therefore, the carrier frequency f at which the necessity for cooling arises is set as a threshold frequency $f_0$.

Returning to FIG. 2, if a positive determination is made in S12, the stopped electric oil pump 44 is driven (S14). This procedure is executed through the function of the EOP operation control unit 78 of the control device 70. More specifically, a drive command signal is output from the control device 70 to the EOP drive circuit 62. If a negative determination is made in S12, the electric oil pump 44 remains stopped without being driven.

In S14, the electric oil pump 44 is driven instead of using the mechanical oil pump 42 for the following reason. That is, the mechanical oil pump is driven by the engine 14. In addition, the discharge rate of the coolant 50 is determined in accordance with the rotational speed of the engine 14. In this manner, the cooling capacity of the mechanical oil pump 42 changes depending on the operation state of the engine 14. For example, when the rotational speed of the engine 14 is low, the coolant 50 that is needed to cool the rotating electrical machine 18 is not discharged. On the other hand, the electric oil pump 44 can discharge a certain amount of the coolant 50 regardless of the operation state of the engine 14. Therefore, the rotating electrical machine 18 can be appropriately cooled. Due to this difference, if a positive determination is made in S12, the electric oil pump 44 is driven instead of the mechanical oil pump 42. Accordingly, the control device drives the electric oil pump when the carrier frequency is equal to or lower than the threshold frequency.

Thus, the electric oil pump 44 can discharge a predetermined amount of the coolant 50 without depending on the rotational speed of the engine 14 as in the case of the mechanical oil pump 42. By using this electric oil pump 44, the rotating electrical machine 18 can be appropriately cooled even when the carrier frequency is changed to a low value.

Figure 4:
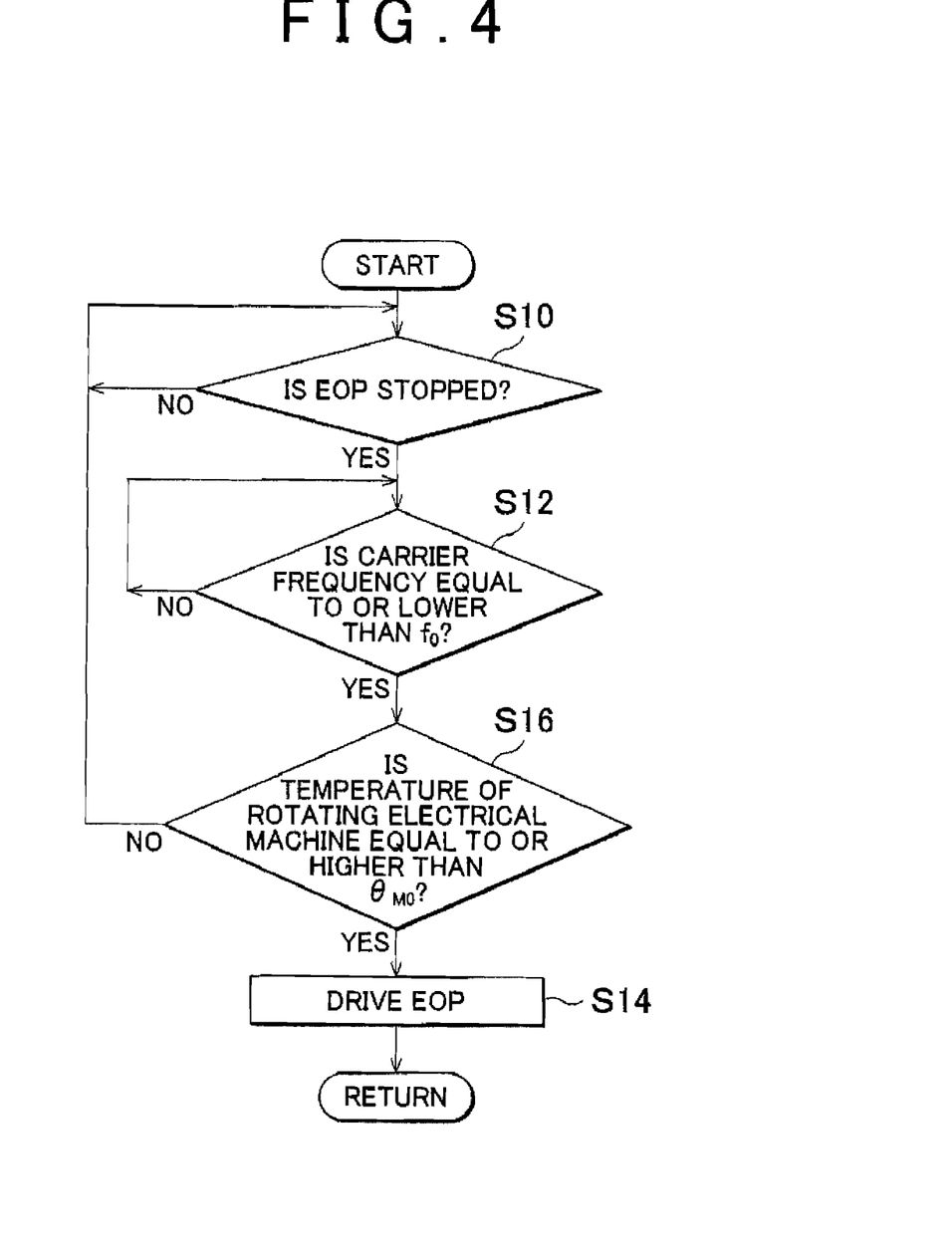
FIG. 4 is a flowchart showing procedures of driving the electric oil pump in accordance with a carrier frequency and a temperature of the rotating electrical machine in the embodiment according to the invention.

When the electric oil pump 44 is driven, an electric power is thereby consumed, so that the fuel economy of the hybrid vehicle as a whole deteriorates. Thus, it is preferable to drive the electric oil pump 44 only when it is actually necessary to do so. FIG. 4 is a flowchart showing procedures for restraining fuel economy from deteriorating, as an improved version of the procedures of FIG. 2. The respective procedures correspond to the respective processing procedures of the oil pump operation control pro gram.

Since S12 and S14 in FIG. 4 are the same as FIG. 2 respectively, detailed description thereof is omitted. In this case, if a positive determination is made in S12, it is then determined whether or not the actual temperature $\theta_M$ of the rotating electrical machine 18 is equal to or higher than a predetermined first threshold temperature $\theta_{M0}$ (S16). This procedure is executed through the function of the rotating electrical machine temperature determination unit 74 of the control device 70. More specifically, data detected by the temperature detector 24 are acquired, transmitted to the control device 70, and compared with the first threshold temperature $\theta_{M0}$. As the first threshold temperature $\theta_{M0}$, it is possible to use a temperature at which the rotating electrical machine 18 is not overheated.

If a positive determination is made in S16, the stopped electric oil pump 44 is driven (S14). This procedure is the same as the contents described with reference to FIG. 2, and therefore, detailed description thereof is omitted. If the temperature $\theta_M$ of the rotating electrical machine 18 is lower than the first threshold temperature $\theta_{M0}$, a negative determination is made in S16, the electric oil pump 44 remains stopped instead of being driven, and a return to S10 is made.

A comparison between FIG. 4 and FIG. 2 reveals that the procedure of S16 is added in FIG. 4. While a decrease in the carrier frequency f is used as an indicator of a rise in the temperature of the rotating electrical machine 18 in FIG. 2, it is additionally determined, using the temperature $\theta_M$ of the rotating electrical machine 18, whether or not the temperature of the rotating electrical machine 18 has risen in FIG. 4. Thus, the electric oil pump 44 can be restrained from being unnecessarily driven, and the fuel economy of the hybrid vehicle as a whole can be restrained from deteriorating. Accordingly, the control device 70 drives the electric oil pump 44 when the carrier frequency is equal to or lower than the threshold frequency and also, the temperature of the rotating electrical machine is equal to or higher than the predetermined first threshold temperature $\theta_{M0}$. In addition, the control device 70 prohibits drive of the electric oil pump 44 when the temperature of the rotating electrical machine 18 is lower than the predetermined first threshold temperature $\theta_{M0}$ even if the carrier frequency f is equal to or lower than the threshold frequency.

Figure 5:
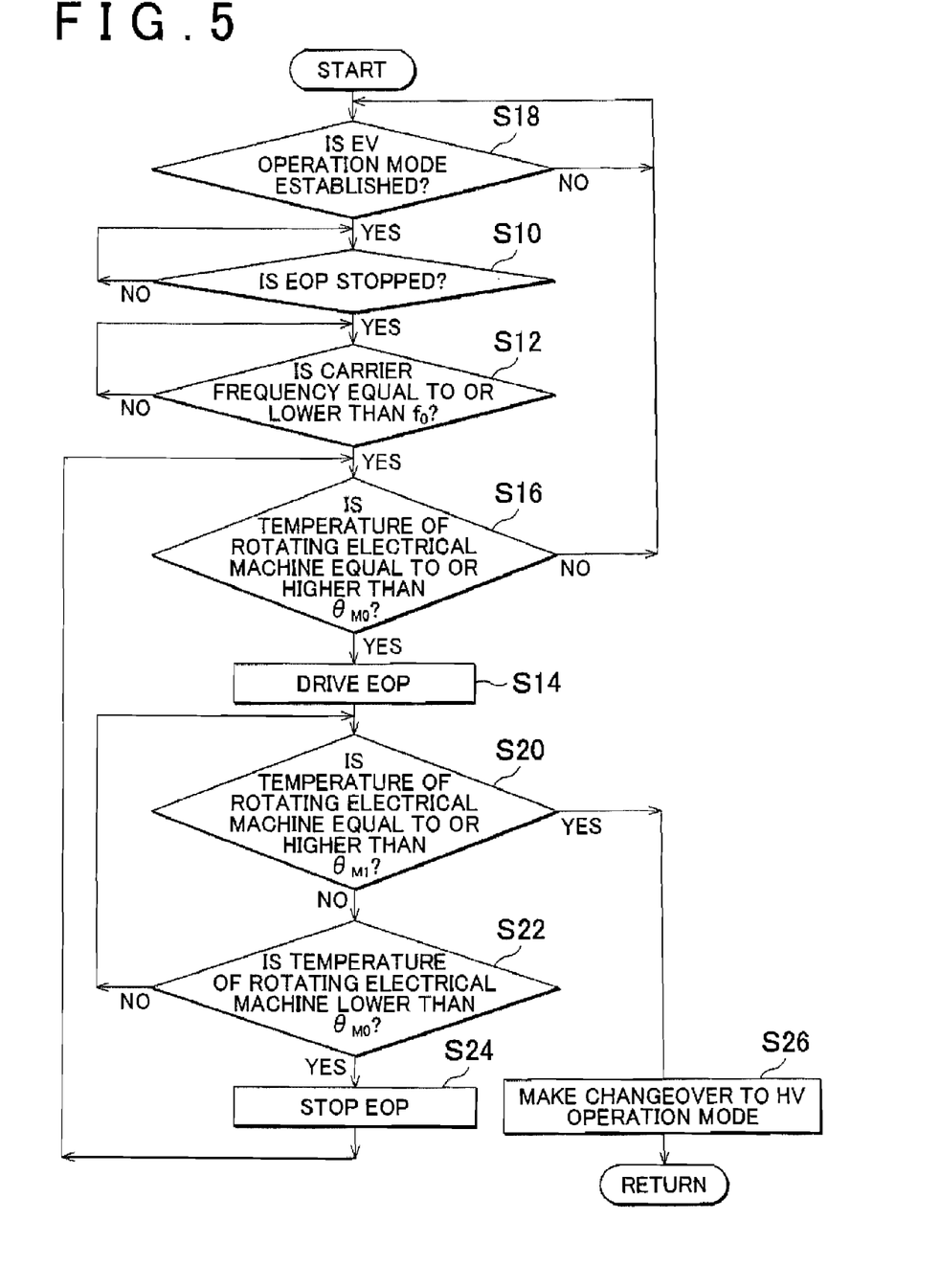
FIG. 5 is a flowchart showing processing procedures at the time when the cooling by the electric oil pump is insufficient in the embodiment according to the invention.

Although the electric oil pump 44 discharges a certain amount of the coolant 50, the discharge rate of the electric oil pump 44 may be insufficient to cool the rotating electrical machine 18. FIG. 5 is a flowchart showing procedures executed when the cooling capacity of the electric oil pump 44 is insufficient, as an improved version of FIG. 4. The respective procedures correspond to respective processing procedures of the oil pump operation control program.

In this case, first of all, it is determined whether or not the operation mode of the motive power unit 12 is the EV operation mode (S18). This determination can be made on the basis of an operation command signal that is output from the control device 70 to the motive power unit 12. Alternatively, in the case where each of the engine 14 and the rotating electrical machine 18 is provided with rotational speed detection means, the determination can also be made on the basis of whether or not the engine 14 is rotating and whether or not the rotating electrical machine 18 is rotating. That is, if the rotating electrical machine 18 is rotating and the engine 14 is not rotating, a positive determination is made in S18.

If a negative determination is made in S18, the operation mode of the motive power unit 12 is the HV operation mode, so that no transition to the subsequent steps is made. Although the same holds true for FIGS. 2 and 4 as well, the procedure of S18 is shown to draw attention in the case of FIG. 5, because the processing of making a changeover to the HV operation mode is performed in S26.

If a positive determination is made in S18, the procedures of S10, S12, S16, and S14 as described with reference to FIG. 4 are sequentially executed in this order. The contents of these procedures are identical to those described with reference to FIG. 4, and therefore, detailed description thereof is omitted.

After the processing of S14 is performed, it is determined whether or not the actual temperature $\theta_M$ of the rotating electrical machine 18 is equal to or higher than a predetermined second threshold temperature $\theta_{M1}$ (S20). The contents of this procedure are similar to those of S16, but are different therefrom in that the data detected by the temperature detector 24 are compared not with the first threshold temperature $\theta_{M0}$ but with the second threshold temperature $\theta_{M1}$, which is higher than the first threshold temperature $\theta_{M0}$. The second threshold temperature $\theta_{M1}$ is used to determine whether the cooling by the electric oil pump 44 is sufficient or insufficient. Therefore, $(\theta_{M1}-\theta_{M0})$ can be set as an appropriate value ranging from several ° C. to about 10° C., in consideration of a measurement error.

If a negative determination is made in S20, the cooling by the electric oil pump 44 is sufficient. Therefore, it is then determined whether or not the temperature $\theta_M$ of the rotating electrical machine 18 is lower than the first threshold temperature $\theta_{M0}$ (S22). The contents of the determination in this procedure are the opposite of those of S16. If a positive determination is made in S22, the cooling by the electric oil pump 44 is sufficient and the rotating electrical machine 18 is not overheated, so that the rotating electrical machine 18 no longer needs to be cooled. Thus, the electric oil pump 44 is stopped from being driven (S24), and a return to S16 is made. If a negative determination is made in S22, the electric oil pump 44 continues to be driven, and a return to S20 is made to monitor a determination on whether or not the temperature $\theta_M$ of the rotating electrical machine 18 becomes equal to or higher than the second threshold temperature $\theta_{M1}$.

If a positive determination is made in S20, the cooling by the electric oil pump 44 is insufficient. Therefore, the operation mode of the motive power unit 12 is changed over from the EV operation mode to the HV operation mode (S26). The control device 70 prohibits operate of the internal combustion engine 14 when the temperature of the rotating electrical machine 18 is higher than the predetermined second threshold temperature $\theta_{M1}$, which is higher than the predetermined first threshold temperature $\theta_{M0}$, after the electric oil pump 44 is driven. Then, the control device 70 changes over the operation mode of the motive power unit from the EV operation mode in which the rotating electrical machine 18 is operated to the HV operation mode in which both the internal combustion engine 14 and the rotating electrical machine 18 can be operated, thereby starting the internal combustion engine 14 to driving the mechanical oil pump 42. By changing the operation mode to the HV operation mode, it becomes possible to start the engine 14 and operate the mechanical oil pump 42. The discharge rate of the mechanical oil pump 42 is increased by raising the rotational speed of the engine 14. Thus, a required cooling capacity can be ensured. Incidentally, since the output of the engine 14 contributes to the output required of the hybrid vehicle, the output of the rotating electrical machine 18 can be made low. In this manner as well, the temperature of the rotating electrical machine 18 can be held low.

When the mechanical oil pump 42 is driven, the electric oil pump 44 may be left to be driven. At this time, since the cooling capacity of the electric oil pump 44 and the cooling capacity of the mechanical oil pump 42 are summated, the rotating electrical machine 18 is effectively cooled. Because electric power is consumed to drive the electric oil pump 44, the electric oil pump 44 may be stopped from being driven when the mechanical oil pump 42 is driven. In this case, the mechanical oil pump 42 begins to be driven after the check valve 48 is completely closed by stopping the electric oil pump 44 from being driven. In this manner, the coolant 50 can be prevented from flowing backward between the mechanical oil pump 42 and the electric oil pump 44.

Figure 6:
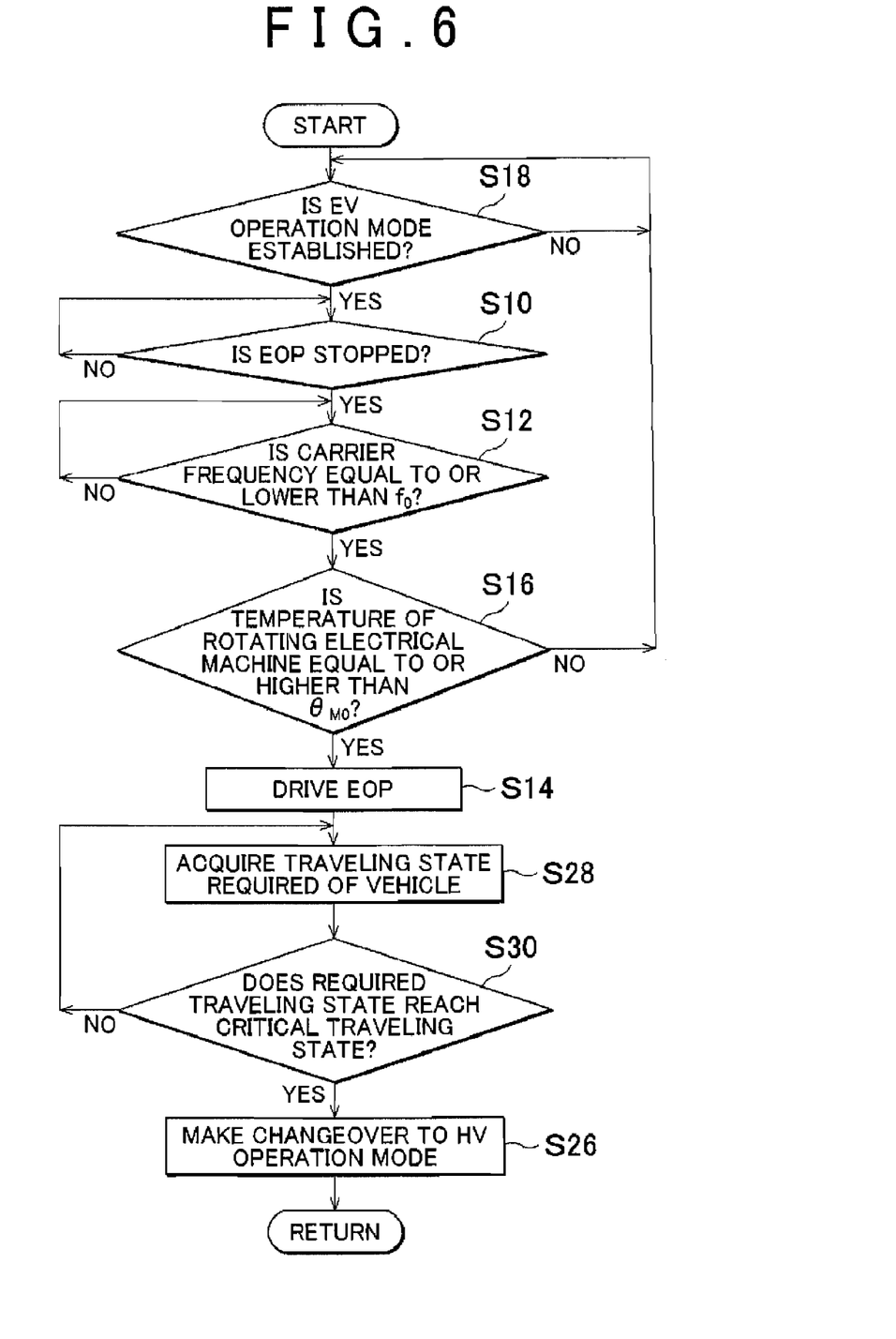
FIG. 6 is a flowchart showing procedures of changing the operation mode of a power unit in accordance with a carrier frequency, a temperature of the rotating electrical machine, and a required vehicle traveling state in the embodiment according to the invention.

In the case where the temperature of the rotating electrical machine 18 rises, it is possible to determine whether or not the rotating electrical machine 18 can be cooled by the electric oil pump 44 alone by finding out a traveling state of the hybrid vehicle, without needing to determine whether or not the temperature $\theta_M$ of the rotating electrical machine 18 is equal to or higher than the second threshold temperature $\theta_{M1}$. FIG. 6 is a flowchart showing procedures of a method of determining whether or not the cooling capacity of the electric oil pump 44 becomes insufficient on the basis of a traveling state of the hybrid vehicle required by a user. The respective procedures correspond to respective processing procedures of the oil pump operation control program.

In this case, the procedures of S18, S10, S12, S16, and S14 are completely the same as in FIG. 5. After the processing of S14 is performed, a traveling state required of the hybrid vehicle is acquired (S28). The required traveling state can be acquired as an output and a vehicle speed that are required of the hybrid vehicle, from a degree of depression of an accelerator by the user, an operation of a brake pedal by the user, and the like. It is then determined whether or not the required traveling state thus acquired reaches a critical traveling state (S30). This procedure is executed through the function of the vehicle required traveling state determination unit 76 of the control device 70.

It should be noted herein that the critical traveling state is a vehicle traveling state in which a required cooling capacity of the pump unit 40 corresponding to a traveling state of the hybrid vehicle as a required cooling capacity corresponding to the traveling state can be covered by the electric oil pump 44 alone. A value indicating the critical traveling state may be other than the temperature $\theta_M$ of the rotating electrical machine 18. For example, it is possible to use a power or a torque as an output of the motive power unit 12, a vehicle speed of the hybrid vehicle, an accelerator depression degree corresponding to these values, a time-dependent change rate of the accelerator depression degree, a rotational speed of the axle, a rotational speed of the rotating electrical machine 18, a rotational speed of the engine 14, or the like.

Figure 7:
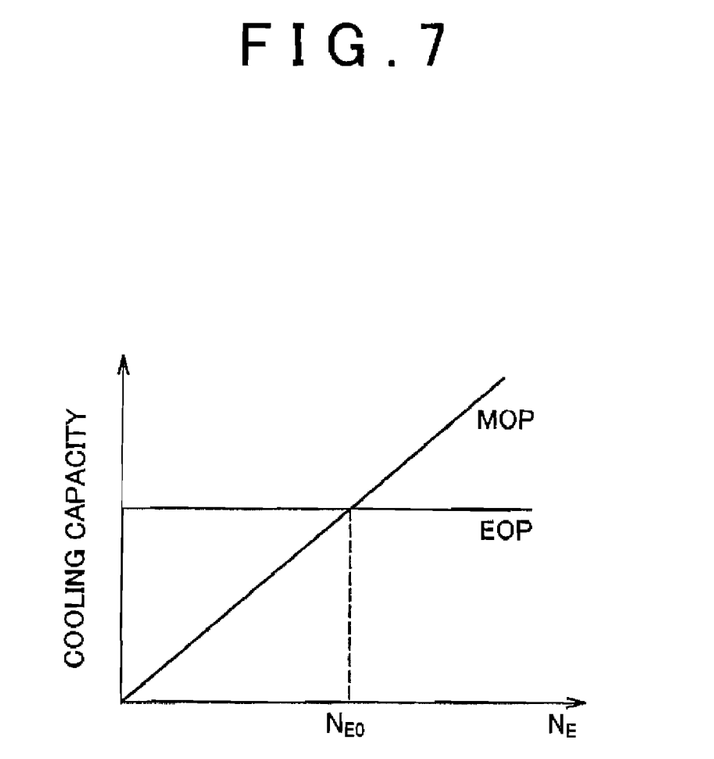
FIG. 7 is a diagram showing cooling capacities of a mechanical oil pump and the electric oil pump.

FIG. 7 shows an example in which a threshold rotational speed $N_{E0}$ about the rotational speed $N_E$ of the engine 14 is used as a value indicating the critical traveling state. In FIG. 7, the axis of abscissa represents the rotational speed $N_E$ of the engine 14, and the axis of ordinate represents the cooling capacity of the mechanical oil pump 42 or the cooling capacity of the electric oil pump 44. In this case, a rectilinear characteristic line stretching rightward and upward with respect to $N_E$ is shown as MOP. This is a cooling capacity characteristic line of the mechanical oil pump 42. Besides, a characteristic line that is constant with respect to $N_E$ is shown as EOP. This is a cooling capacity characteristic line of the electric oil pump 44.

The threshold rotational speed $N_{E0}$ is the rotational speed $N_E$ of the engine 14 at which the cooling capacity characteristic line of the mechanical oil pump 42 and the cooling capacity characteristic line of the electric oil pump 44 intersect with each other. When the rotational speed $N_E$ of the engine 14 is equal to the threshold rotational speed $N_{E0}$, the cooling capacity of the mechanical oil pump 42 is lower than the cooling capacity of the electric oil pump 44. It is therefore preferable to drive the electric oil pump 44 in this range. On the other hand, when the rotational speed $N_E$ of the engine 14 is equal to or higher than the threshold rotational speed $N_{E0}$, the cooling capacity of the mechanical oil pump 42 is higher than the cooling capacity of the electric oil pump 44. Accordingly, in this range, when the cooling capacity of the electric oil pump 44 is insufficient to cool the rotating electrical machine 18, it is preferable to drive the mechanical oil pump 42. In this manner, the threshold rotational speed $N_{E0}$ can be used as a value indicating the critical traveling state.

Returning again to FIG. 6, if a negative determination is made in S30, the electric oil pump 44 continues to be driven, and a return to S28 is made. If a positive determination is made in S30, the operation mode of the motive power unit 12 is changed over from the EV operation mode to the HV operation mode (S26). Thus, the engine 14 is started, and the mechanical oil pump 42 is driven. These contents are the same as those of S26 in FIG. 5, and therefore, detailed description thereof is omitted. In this manner, the rotating electrical machine 18 can be appropriately cooled without comparing the temperature $\theta_M$ of the rotating electrical machine 18 with the second threshold temperature $\theta_{M1}$.

The vehicle control system according to the invention can be utilized for a vehicle that is mounted with a mechanical oil pump and an electric oil pump.

While the disclosure has been explained in conjunction with the specific exemplary embodiment thereof, it is evident that many alternatives, modifications, and variations will be apparent to those skilled in the art. Accordingly, the exemplary embodiment of the disclosure as set forth herein is intended to be illustrative, not limiting. There are changes that may be made without departing from the scope of the disclosure.

What is claimed is:

1. A vehicle control system comprising:
    a motive power unit that has a rotating electrical machine, the rotating electrical machine is a motor-generator;
    a drive circuit that is connected to the rotating electrical machine and operates on a basis of a certain carrier frequency;
    a pump unit that circulates a coolant that cools the rotating electrical machine; and
    a control device that increases a cooling capacity of the pump unit for cooling the rotating electrical machine when the carrier frequency is equal to or lower than a preset threshold frequency.

2. The vehicle control system according to claim 1, wherein
    the threshold frequency is set to be a carrier frequency at which a rise in temperature of the rotating electrical machine occurs according to a decrease in the carrier frequency.

3. The vehicle control system according to claim 1, wherein
    the pump unit has an electric oil pump, and
    the control device drives the electric oil pump when the carrier frequency is equal to or lower than the threshold frequency.

4. The vehicle control system according to claim 3, wherein
    the control device drives the electric oil pump when the carrier frequency is equal to or lower than the threshold frequency and a temperature of the rotating electrical machine is equal to or higher than a predetermined first threshold temperature, and prohibits drive of the electric oil pump when the temperature of the rotating electrical machine is lower than the predetermined first threshold temperature even if the carrier frequency is equal to or lower than the threshold frequency.

5. The vehicle control system according to claim 4, wherein
    the motive power unit further has an internal combustion engine,
    the pump unit further has a mechanical oil pump that is driven by the internal combustion engine,
    the control device starts the internal combustion engine to drive the mechanical oil pump by changing over an operation mode of the motive power unit from an EV operation mode in which the rotating electrical machine is operated without operating the internal combustion engine to an HV operation mode in which both the internal combustion engine and the rotating electrical machine can be operated when a temperature of the rotating electrical machine is higher than a predetermined second threshold temperature, which is higher than the predetermined first threshold temperature, after the electric oil pump is driven.

6. The vehicle control system according to claim 4, wherein the motive power unit further has an internal combustion engine, the pump unit further has a mechanical oil pump that is driven by the internal combustion engine, the control device drives the electric oil pump when the carrier frequency is equal to or lower than the threshold frequency and a temperature of the rotating electrical machine is equal to or higher than the predetermined first threshold temperature when there is established an EV operation mode in which the rotating electrical machine is operated without operating the internal combustion engine, then maintains an operation mode of the motive power unit unchanged from the EV operation mode even when a required traveling state that is required of the vehicle has not reached a critical traveling state, and starts the internal combustion engine to drive the mechanical oil pump by changing over the operation mode from the EV operation mode to an HV operation mode in which both the internal combustion engine and the rotating electrical machine can be operated when the required traveling state has reached the critical traveling state.

7. The vehicle control system according to claim 6, wherein the critical traveling state is a traveling state of the vehicle in which a required cooling capacity of the pump unit corresponding to a traveling state of the vehicle can be covered by the electric oil pump alone.

8. A vehicle control method comprising:

increasing a cooling capacity of a pump unit that circulates a coolant that cools a rotating electrical machine, the rotating electrical machine is a motor-generator, when a carrier frequency preset for a drive circuit that is connected to the rotating electrical machine is equal to or lower than a threshold frequency.

9. The vehicle control system according to claim 1, wherein the motor-generator is configured to switch between operating in a motor state and in a generator state.

10. The vehicle control system according to claim 9, in the motor state the motor-generator operates as a motor when supplied with electric power, and in the generator state the motor-generator operates as a generator to generate electric power.

11. The vehicle control method according to claim 8, wherein the motor-generator is configured to switch between operating in a motor state and in a generator state.

12. The vehicle control method according to claim 9, in the motor state the motor-generator operates as a motor when supplied with electric power, and in the generator state the motor-generator operates as a generator to generate electric power.

* * * * *